United States Patent Office …

3,346,584
2-POLYCHLOROALKYLBENZOTHIAZOLINES
David T. Manning, South Charleston, W. Va., and
Anthony A. Sousa, Raleigh, N.C., assignors to
Union Carbide Corporation, a corporation of New
York
No Drawing. Filed Sept. 23, 1964, Ser. No. 398,799
9 Claims. (Cl. 260—304)

This invention relates to novel 2-polychloroalkyl-benzothiazolines, and to a process for their preparation. In a particular aspect, this invention is concerned with pesticidally-active 2-polychloroalkylbenzothiazolines, and their preparation from polychloroaldehydes and 2-aminobenzenethiols.

A literature search has failed to reveal any prior preparation of 2-polychloroalkylbenzothiazolines encompassed within this invention.

Accordingly, an object of this invention is to provide novel 2-polychloroalkylbenzothiazolines. Another object is to provide novel 2-polychloromethylbenzothiazolines. Another object is to provide novel 2-trichloroalkylbenzothiazolines. Another object is to provide novel 2-polychloroalkylbenzothiazolines which are effective bactericides. Still another object is to provide novel nematocidal 2-trichloromethylbenzothiazolines. A further object is to provide novel 2-trichloromethylbenzothiazolines, and benzene ring-substituents thereof. Another object is to provide a novel method for the preparation of 2-polychloroalkylbenzothiazolines from polychloroaldehydes and 2-aminobenzenethiols. A still further object is to provide novel 2-trichloromethylbenzothiazolines from chloral and 2-aminobenzenethiols. Another object is to provide a novel method for destroying pathogens which attack plant life by subjecting the pathogen to a pesticidally effective amount of a 2-polychloroalkylbenzothiazoline. These and other objects of this invention will become apparent to those skilled in the art to which this invention pertains from the ensuing description of the invention.

In general, the novel 2-polychloroalkylbenzothiazolines of this invention can be represented by Formula I:

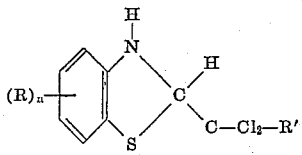

wherein R can be hydrogen, halogen, nitro, alkyl, alkenyl, alkoxy, aryloxy, alkylthio, arylthio, cyano, carboxy, carbamoyl, thiocarbamoyl, acylamido, aroylamido, alkoxycarbonyl, aryloxycarbonyl, alkylthiocarbonyl, arylthiocarbonyl, alkoxysulfinyl, aryloxysulfinyl, acyl, aryl, aroyl, alkylsulfonyl, arylsulfonyl, and like groups; R' can be hydrogen, chlorine, chloromethyl, aralkyl, chloroaralkyl, chloro-alkyl, alkyl, and aryl; and $n$ is an integer of from 0 to 4, inclusive, limited only as to total number of any one particular substituent disclosed hereinafter.

It can readily be seen from Formula I that two classes of structural modifications can be made in the 2-polychloroalkylbenzothiazolines of this invention: (1) in the 2-polychloroalkyl group

and (2) in the benzene ring portion

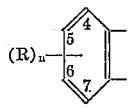

The 2-polychloroalkyl group can be, for example,

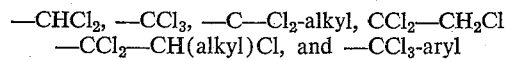

and the like. Substitutions on the benzene ring portion can occur at none, one or all of the positions 4, 5, 6, and 7, limited only to total number of any one particular substituent disclosed hereinafter.

With reference to Formula I, R substituents each individually on any one unsubstituted ring carbon atom 4, 5, 6, or 7 of the benzene ring portion, and limitations therefor, are as follows: —H, —Cl, —Br, —F, and —I, with a maximum of two —I atoms, one —F atom, two —Br atoms and three —Cl atoms; —NO$_2$, with a maximum of one; alkyl of from one to twelve carbon atoms, with a maximum of three alkyl groups; alkenyl of from two to twelve carbon atoms, with a maximum of two alkenyl groups; alkoxy, aryloxy, and their sulfur analogs alkylthio and arylthio, with a total carbon content of from one to eight and 6 to 10 carbon atoms, respectively, and a maximum of any two of such groups; —CN, —COOH, and —CONH$_2$, with a maximum of one of these groups; acylamido

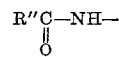

wherein R" is alkyl of from one to eight carbon atoms, with a maximum of one acylamido group; aroylamido

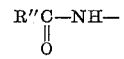

wherein R" is aryl with a total carbon content of from six to ten carbon atoms, with a maximum of one aroylamido group; acyloxy

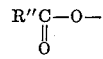

wherein R" is alkyl of from one to eight carbon atoms, with a maximum of one acyloxy group; aroyloxy

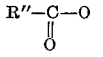

wherein R" is aryl with a total carbon content of from six to ten carbon atoms, with a maximum of one aroyloxy group; alkoxycarbonyl

wherein R" is alkyl of from one to eight carbon atoms, with a maximum of one alkoxycarbonyl group; aryloxycarbonyl

wherein R" is aryl with a total carbon content of from six to ten carbon atoms, with a maximum of one aryloxycarbonyl group; and sulfur analogs alkylthiocarbonyl

wherein R" is alkyl of from one to eight carbon atoms, with a maximum of one alkylthiocarbonyl group; arylthiocarbonyl

wherein R" is aryl with a total carbon content of from six to ten carbon atoms, with a maximum of arylthiocarbonyl group; alkoxysulfinyl

wherein R″ is alkyl of from one to eight carbon atoms, with a maximum of one alkoxysulfinyl group; aryloxysulfinyl

wherein R″ is aryl with a total carbon content of from six to ten carbon atoms, with a maximum of one aryloxysulfinyl group; acyl

wherein R″ is hydrogen or alkyl of from one to eight carbon atoms, with a maximum of one acyl group; and aroyl

wherein R″ is aryl with a total carbon content of from six to ten carbon atoms with a maximum of one aroyl group.

A particular aspect of this invention resides in novel 2-polychloroalkylbenzothiazolines as represented by Formula I, wherein R can be groups such as $NO_2$, CN, $CO_2R''$, COOH, or

wherein R″ is as hereinbefore defined, and hydrogen, alkyl ($C_1$–$C_5$), cycloalkyl ($C_5$–$C_6$), aryl ($C_6$–$C_{10}$), alkoxy ($C_1$–$C_5$), chloro, acyloxy, and aroyloxy, wherein the alkyl portion of the acyloxy group contains from 1 to 5 carbon atoms and the aryl portion of the aroyloxy group contains from 6 to 10 ring carbon atoms; R′ can be chlorine, hydrogen, chloromethyl, alpha-chloroalkyl ($C_1$–$C_5$), cycloalkyl ($C_5$–$C_6$), chloro-substituted cycloalkyl ($C_5$–$C_6$), phenyl, chloro-substituted phenyl, aralkyl, and chloro-substituted aralkyl containing the chlorine substituents in the alkyl moiety; and $n$ is an integer from 1 to 4, inclusive, with the maximum number of groups, other than hydrogen, as disclosed hereinabove.

Preferred 2-polychloroalkylbenzothiazolines are those wherein with reference to Formula I, R is either one $NO_2$, CN, $CO_2R''$, COOH or

group, wherein R″ is alkyl of from 1 to 5 carbon atoms or aryl of from 6 to 10 ring carbon atoms, or R is a maximum of 4 hydrogen atoms, a maximum of 3 alkyl groups of from 1 to 5 carbon atoms in each alkyl group, a maximum of 2 chloroalkyl groups each of from 1 to 5 carbon atoms with one to three chlorine atoms, a maximum of 1 aryl group with from 6 to 10 carbon atoms, a maximum of 2 alkoxy groups each of from 1 to 5 carbon atoms, a maximum of three chloro, 2 bromo or 2 iodo atoms, a maximum of 1 fluoro atom, a maximum of 1 acyloxy group of from 2 to 5 carbons, and a maximum of 1 aroyloxy group of from 6 to 10 carbon atoms; and R′ is chlorine, hydrogen, chloromethyl, alpha-chloroalkyl of from 2 to 5 carbon atoms, alkyl of from 1 to 5 carbon atoms, phenyl, chloro-substituted phenyl, and aralkyl and containing from 2 to 5 carbon atoms and from 0 to 1 chlorine atom in the alkyl chain. In the event of less than maximum substitution on the 4, 5, 6 and 7 positions (one substituent on each carbon atom at these positions) it is understood that the remaining positions will contain hydrogen.

The most preferred 2-polychloroalkylbenzothiazolines of this invention are the 2-polychloromethylbenzothiazolines and the 2-trichloroalkylbenzothiazolines such as, the 2-trichloromethylbenzothiazolines, the 2-dichloromethylbenzothiazolines, and the 2-(1,1,2-trichloroethyl)-benzothiazolines. The most preferred R substituents, with reference to Formula I, on the benzene ring portion of these latter compounds are hydrogen chloro, nitro, methoxy, ethoxy, and alkyl of from one to five carbon atoms.

Broadly, the novel 2-polychloroalkylbenzothiazolines (I) of this invention can be prepared by the reaction of a polychloroaldehyde (II) with the appropriate 2-aminobenzenethiol (III) as shown in reaction scheme (A):

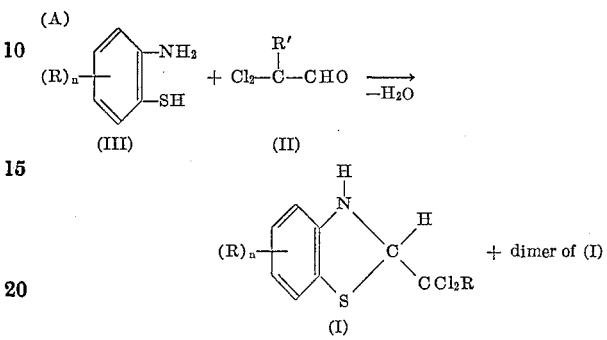

wherein R, R′, and $n$ are as hereinbefore defined with reference to Formula I, supra. The desired 2-polychloroalkylbenzothiazolines are readily produced by spontaneous elimination of water from the interreaction of the reactants (II) and (III) with each other. A small amount of 2-polychloroalkylbenzothiazoline dimer by-product is also formed in some cases.

In general, the reaction conditions for the process of this invention are not critical. In reaction scheme (A), the reaction is carried out with the desired polychloroaldehyde (II) and appropriate 2-aminobenzenethiol (III) in an organic solvent, e.g., benzene, preferably blanketed with an inert atmosphere, such as nitrogen, followed by refluxing and evaporation of the solvent to give the desired crude 2-polychloroalkylbenzothiazoline (I). The crude 2-polychloroalkylbenzothiazoline (I) can be readily purified by standard techniques well-known in the art. The temperature of the reaction can vary from about 20° C. to about 90° C., with a temperature of from about 25° C. to about 70° C. preferred. The pressure at which the reaction can be carried out is either atmospheric, subatmospheric or superatmospheric pressure, with atmospheric pressure preferred.

Synthetic methods for the preparation of the 2-aminobenzenethiol starting materials can be found, for example, in "Heterocyclic Compounds," by C. Elderfield, vol. 5, pp. 506–508 (1957), and in Chem. Rev., 57, 1011 (1957). Synthetic methods for the preparation of the polychloroaldehyde starting materials can be found in the chemical literature, for example, in J. Chem. Soc., 125, 1097–1101 (1924).

Particularly 2-polychloroalkylbenzothiazolines the preparation of which are embraced within this invention are those, with reference to reaction scheme (A), wherein the 2-aminobenzenethiol (III) is as noted with reference to reaction scheme (A), and the polychloroaldehyde (II) is either chloral, 2,2,3 - trichloropropionaldehyde or 2-dichloroacetaldehyde, to give 2 - trichloromethylbenzothiazolines, 2 - (1,1,2 - trichloroethyl)benzothiazolines, and 2-dichloromethylbenzothiazolines, respectively.

The following specific examples will more fully illustrate this invention.

EXAMPLE I

*2-trichloromethylbenzothiazoline*

A mixture of 37 g. (0.251 mole) of redistilled chloral and 31.4 g. (0.251 mole) of o-aminobenzenethiol in 100 ml. of benzene solution was blanketed with nitrogen and refluxed for a 2.16-hour period under a Dean-Stark trap during which time 4.4 g. of water were removed. Evaporation of the benzene solvent under reduced pressure gave 62.5 of crude 2 - trichloromethylbenzothiazoline which when recrystallized from hexane weighed 48.0 g. (75.3 percent yield), M.P. 89.5–90° C. (dec.).

*Analysis.*—Calcd. for $C_8H_6NSCl_3$: C, 37.74; H, 2.37; N, 5.50; Cl, 41.78. Found: C, 37.99; H. 2.40; N, 5.58; Cl 41.03.

The infrared spectrum included bands at $2.95\mu$ (N—H), $3.25\mu$ (aromatic C—H), $3.43\mu$ (aliphatic C—H), $6.33\mu$, $6.68\mu$ and $6.78\mu$ (aromatic C=C), and $12.2\mu$ and $12.57\mu$ ($CCl_3$), all in agreement with the assigned structure.

EXAMPLE II

2-dichloromethylbenzothiazoline 0.3 mole (37.5 g.) of o-aminobenzenethiol was treated with 0.3 mole (33.9 g.) of redistilled dichloroacetaldehyde in 75 ml. of benzene under conditions very similar to those employed in the chloral reaction of Example I. Working up the reaction mixture in a similar manner as in Example I afforded 26.8 g. of a recrystallized (hexane) first crop, M.P. 76.5–77.5° C.

*Analysis.*—Calcd. for $C_8H_6NSCl_2$: C, 43.65; H, 3.21; N, 6.36. Found: C, 43.90; H, 3.54; N, 6.50.

The yield, including a second crop (13.4 g., M.P. 64–70°), was 60.9%

EXAMPLE III

5-chloro-2-trichloromethylbenzothiazoline

A mixture of 12.1 g. (0.076 mole) of 2-amino-4-chlorobenzenethiol and 11.2 g. (0.076 mole) of chloral in 170 ml. benzene solution was refluxed for 4.2 hours under a Dean-Stark trap after which the product was obtained by evaporation of solvent and recrystallization from hexane. The yield was 12.0 g. (54.6% yield) of 5-chloro-2 - trichloromethylbenzothiazoline, M.P. 79.5–81° C. A second recrystallization gave an analytical sample, M.P. 78–80° C.

*Analysis.*—Calcd. for $C_8H_5NSCl_4$: C, 33.24; H, 1.74; N, 4.85. Found: C, 33.30; H, 1.65; N, 4.65.

EXAMPLE IV

2-(1,1,2-trichloroethyl)benzothiazoline

A mixture of 50.1 g. (0.4 mole) of o-aminobenzenethiol, 58.1 g. (0.4 mole) of 2,2,3 - trichloropropionaldehyde and 250 ml. of benzene was refluxed under a Dean-Stark trap, with continuous removal of water, for a period of 40 minutes. The solvent was then evaporated to give 101.7 g. of residue (theoretical=107.4 g.) which was extracted repeatedly with hexane. The hydrocarbon solution was treated with charcoal, concentrated and cooled to yield 54.1 g. of pure 2-(1,1,2-trichloroethyl)benzothiazoline, M.P. 65.6–68° with vigorous HCl liberation at 120° C.

*Analysis.*—Calcd. for $C_9H_8NSCl_3$: C, 40.24; H, 3.00; N, 5.21. Found: C, 40.53; H, 3.03; N, 5.15.

A second crop, wgt. 9.0 g., M.P. 67–75° C., brought the total yield to 58.8%. The infrared spectrum was consistent with the expected structure for 2-(1,1,2-tri-chloroethyl)benzothiazoline.

EXAMPLE V

5-chloro-2-(1,1,2-trichloroethyl)benzothiazoline

A mixture of 7.4 g. (0.046 mole) of 2-amino-4-chlorobenzenethiol and 6.8 g. (0.046 mole) of 2,2,3-trichloropropionaldehyde in 75 ml. of benzene was refluxed for 1.58 hours under a Dean-Stark trap after which benzene was removed from the reaction mixture by evaporation under reduced pressure. The resulting solid was recrystallized from hexane to give 7.5 g. (53.7% yield) of 5-chloro - 2 - (1,1,2 - trichloroethyl)benzothiazoline, M.P. 79–80° C.

*Analysis.*—Calcd. for $C_9H_7NSCl_4$: C, 35.67; H, 2.33; N, 4.62. Found: C, 35.94; H, 2.21; N, 4.49.

The infrared spectrum was consistent with the assigned structure.

EXAMPLE VI

Isolation of the dimeric by-product of 2-trichloromethylbenzothiazoline

Attempts to dissolve 12.7 g. of 2-trichloromethylbenzothiazoline in ethanol revealed the presence of 1.0 g. of an insoluble crystalline impurity, M.P. 144.5–145.5° C. with HCl evolution. Recrystallization from ethyl acetate raised the decomposition temperature to the general range of 170–180° C., the exact temperature of each determination appearing to vary with the rate of heating.

*Analysis.*—Calcd. for $(C_8H_6NSCl_3)_2$: C, 37.74; H, 2.37; N, 5.50; mol wgt. 509. Found: C, 37.76; H, 2.80; N, 5.52; mol. wgt. 540.

Other 2-polychloroalkylbenzothiazolines encompassed within this invention and which can be prepared in a manner similar to that shown in the aforementioned examples include, 5-bromo-2-(1,1,2-trichloroethyl)benzothiazoline,
2-(1,1-dichlorobutyl)benzothiazoline,
2-(5-phenyl-1,1,2-trichlorohexyl)-6-methoxybenzothiazoline,
2-(1,1-dichlorobenzyl)benzothiazoline,
4-nitro-2-trichloromethylbenzothiazoline,
5,6-dichloro-2-trichloromethylbenzothiazoline,
6-methoxy-2-trichloromethylbenzothiazoline,
4,5-dimethyl-2-trichloromethylbenzothiazoline,
6-acetoxy-7-ethyl-2-trichloromethylbenzothiazoline,
6-chloro-5-methyl-2-trichloromethylbenzothiazoline,
5-bromo-2-trichloromethylbenzothiazoline,
5-cyano-2-trichloromethylbenzothiazoline,
5-carboxy-2-trichloromethylbenzothiazoline,
4-methoxycarbonyl-2-trichloromethylbenzothiazoline,
5-phenoxycarbonyl-2-trichloromethylbenzothiazoline,
4,5,6-trichloro-2-trichloromethylbenzothiazoline,
6-acetoxy-2-trichloromethylbenzothiazoline,
7-phenoxy-2-trichloromethylbenzothiazoline,
6-phenyl-2-trichloromethylbenzothiazoline,
5-dichloromethyl-2-trichloromethylbenzothiazoline,
6-formyl-2-trichloromethylbenzothiazoline,
6-chloro-2-trichloromethylbenzothiazoline,
5-methylthio-2-trichloromethylbenzothiazoline,
6-ethylsulfonyl-2-trichloromethylbenzothiazoline, and the like.

The 2-trichloromethylbenzothiazolines of this invention are useful as precursors to the corresponding 2-dichloromethylbenzothiazoles. Upon treatment with, for example, ferric chloride, or by pyrolysis, the 2-trichloromethylbenzothiazolines of this invention readily provide the corresponding 2-dichloromethylbenzothiazoles. The 2-dichloromethylbenzothiazoles form the basis of copending application Ser. No. 431,189, filed Feb. 8, 1965, and incorporated herein by reference.

The 2-polychloroalkylbenzothiazolines as noted hereinabove are also useful as pesticides. To illustrate this pesticidal activity, 2-trichloromethylbenzothiazoline has shown good control of nematodes; 5-chloro-2-trichloromethylbenzothiazoline and 5 - chloro-2-(1,1,2-trichloroethyl)benzothiazoline have both shown bactericidal activity; 2-dichloromethylbenzothiazoline has shown activity as a soil fungicide; and 2-(1,1,2-trichloroethyl)benzothiazoline has shown fungicidal and bactericidal activity.

A particularly active nematocidal benzothiazoline is 2-trichloromethylbenzothiazoline which gave a nematocidal activity of $ED_3$ at 7 pounds per acre. As used herein, the term $ED_3$ is a given concentration of 2-polychloroalkylbenzothiazoline, e.g. 2 - trichloromethylbenzothiazoline, which will elicit a nematocidal toxicity rating of "3" on a nematocidal toxicity scale of "5." The nematocidal toxicity scale ranges from "1 to 5" wherein the nematocidal toxicity rating is defined as follows:

1=severe galling, equal to control
2=moderate galling
3=light galling
4=very light galling
5=no galling As employed herein, the term $ED_3$ and the well-known term $LD_{50}$, are from a practical standpoint synonymous.

The above nematocidal toxicity rating was obtained as follows. Infective migratory larvae of the root-knot nematode, *Meloydogyne incognita* var. *acrita* was used as the test organism which was reared in the greenhouse on roots of Rutgers variety tomato plant. Infected tomato plant roots were removed from the culture and the roots chopped very finely. A small amount of inoculum from the roots was added to pint jars containing approximately 180 cc. of soil. The jars containing the inoculum and soil were capped and incubated for one week at room temperature. During this period eggs of the root-knot nematode hatched and the larvae forms migrated into the soil. Ten milliliters of the test formulation was added to each of two jars for each dosage treated. Following the addition of the test formulation the jars were capped and the contents thoroughly mixed on a ball mill for 5 minutes. The test formulation was formulated by a standard procedure of solution of 2-trichloromethylbenzothiazoline in acetone, addition of an emulsifier e.g., "Triton X–155," an alkylphenoxy polyethoxyethanol, and dilution with water. The tests were run at 10 mg., 2.5 mg., and 0.625 mg. of 2-trichloromethylbenzothiazole per jar which is approximately 75 lbs., 19 lbs., and 5 lbs. per acre. The jars remained capped at room temperature for a period of 48 hours and the contents were then transferred to 3 inch pots. Subsequently the pots were seeded to cucumber as an indicator crop and placed in the greenhouse where they were cared for in the normal fashion for growing potted cucumber for approximately three weeks. These cucumber plants were then removed from the pots, the soil washed from the roots and the amount of galling visually rated using the aforementioned numbers "1 to 5" with their hereinabove ascribed meanings.

Particularly active bactericidal benzothiazolines are 2-(1,1,2 - trichloroethyl)benzothiazoline and 5 - chloro-2-(1,1,2-trichloroethyl)benzothiazoline as shown in Table I.

of the bacterial colony with a sterile transfer loop and streaking the surface of the agar-benzothiazoline mixture in a designated area by starting at the center of the Petri dish and working toward the edge in a spoke-like fashion. This procedure was repeated by streaking other areas of the dish with other organisms until the agar-benzothiazoline mixture had been inoculated with each of the five test bacteria. The dish was incubated at 20° C. for 48 hours. The ability of the benzothiazoline to inhibit growth of bacteria was visually rated according to the aforementioned "5," "3," and "1" designations.

The benzothiazolines contemplated in this invention may be applied as pesticides, e.g., nematocides according to methods known to those skilled in the art. Pesticidal compositions containing the benzothiazolines as the active toxicant will usually comprise a carrier or diluent, either liquid or solid.

Suitable liquid diluents or carriers include water, petroleum distillates, or other liquid carriers with or without surface active agents. Liquid concentrates may be prepared by dissolving one of these compounds with a non-phytotoxic solvent such as acetone, xylene, or nitrobenzene and dispersing the toxicants in water with the aid of suitable surface active dispersing agents.

The choice of dispersing and emulsifying agent and the amount employed is dictated by the nature of the composition and the ability of the agent to facilitate the dispersion of the toxicant. Generally, it is desirable to use as little of the agent as is possible, consistent with the desired dispersion of the toxicant in the spray so that rain does not re-emulsify the toxicant after it is applied to the plant and wash it off the plant. Nonionic, anionic, or cationic dispersing and emulsifying agents may be employed, for example, the condensation products of alkylene oxides with phenol and organic acids, alkyl aryl sulfonates, complex ether alcohols, quaternary ammonium compounds, and the like.

In the preparation of wettable powder or dust or granulated compositions, the active ingredient is dispersed in and on an appropriately divided solid carrier such as clay, talc, bentonite, diatomaceous earth, fuller's earth, and the like. In the formulation of the wettable powders the aforementioned dispersing agents as well as lignosulfonates can be included.

The required amount of the toxicants contemplated

TABLE I.—BACTERIAL ACTIVITY OF 2-POLYCHLOROALKYLBENZOTHIAZOLINES

| Name | Bacteria [1] | | | | | | | | | |
|---|---|---|---|---|---|---|---|---|---|---|
| | 25 p.p.m. | | | | | 6 p.p.m. | | | | |
| | Sa | Bac | Pa | Cm | Lac | Sa | Bac | Pa | Cm | Lac |
| 5-chloro-2-(1,1,2-trichloroethyl)benzothiazoline | 5 | 5 | 1 | 5 | 5 | 5 | 5 | 1 | 5 | [2] 5 |
| 2-(1,1,2-trichloroethyl)benzothiazoline | 5 | 5 | 1 | 5 | 5 | 5 | 5 | [2] 3 | 5 | [2] 1 |
| Hexachlorophene | 5 | 5 | 3 | 5 | 5 | 5 | 5 | 3 | 5 | 5 |

[1] Sa=*Staphylococcus aureus*. Bac=*Bacillus mesentericus*. Pa=*Pseudomonas aeruginosa*. Cm=*Corynebacterium michiganense*. Lac=*Lactobacillus plantarum*.
[2] 5=No growth. 3=Slight to moderate growth. 1=Severe growth, equal to control as visually rated.

With reference to Table I, the bactericidal activity tests were conducted as follows: The test organisms (bacteria) were cultured on nutrient agar (pH 7.0) at 20° C. To 50 ml. Erlenmeyer flasks containing 18 ml. of sterile melted nutrient agar at 50–60° C. was added 2 ml. of a test solution containing 20 p.p.m. and 6 p.p.m. of the benzothiazoline. Each flask was agitated well to insure thorough and uniform mixing of the benzothiazoline and agar and the mixture was then immediately poured into sterile Petri dishes. When the agar had solidified, it was inoculated with the test bacteria by gently rubbing the surface herein may be applied per acre treated in from 1 to 200 gallons or more of liquid carrier diluent or in from about 5 to 500 pounds of inert solid carrier or diluent. The concentration in the liquid concentrate will usually vary from about 10 to 95 percent by weight and in the solid formulations from about 0.5 to about 90 percent by weight. Satisfactory sprays, dusts, or granules for general use contain from about ¼ to 15 pounds of active toxicant per acre. The pesticides contemplated herein prevent attack by pests upon plants or other material to which the pesticides are applied.

What is claimed is:
1. 2-polychloroalkylbenzothiazolines of the formula:

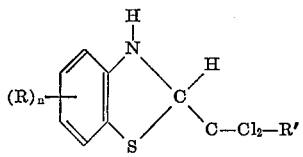

wherein R is hydrogen or halogen, and R' is hydrogen, chlorine, lower alkyl, or lower chloroalkyl, and $n$ is 0 or 1.

2. 2-trichloromethylbenzothiazolines of the formula:

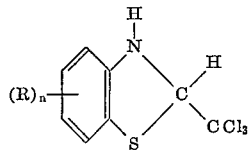

wherein R is hydrogen or halogen, and $n$ is 0 or 1.

3. 2-dichloromethylbenzothiazolines of the formula:

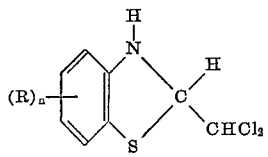

wherein R is hydrogen or halogen, and $n$ is 0 or 1.

4. 2-(1,1,2-trichloroethyl)benzothiazolines of the formula:

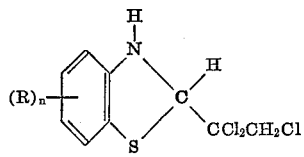

wherein R is hydrogen or halogen, and $n$ is 0 or 1.

5. 2-trichloromethylbenzothiazoline.
6. 2-dichloromethylbenzothiazoline.
7. 5-chloro-2-trichloromethylbenzothiazoline.
8. 2-(1,1,2-trichloroethyl)benzothiazoline.
9. 5-chloro-2-(1,1,2-trichloroethyl)benzothiazoline.

References Cited

Elderfield, Heterocyclic Compounds, vol. 5, 1957, pp. 677–8.

ALEX MAZEL, *Primary Examiner.*

R. J. GALLAGHER, *Assistant Examiner.*